(12) United States Patent
Holma et al.

(10) Patent No.: US 8,934,935 B2
(45) Date of Patent: Jan. 13, 2015

(54) PROCESSING OF UPLINK DATA IN A COMMUNICATIONS SYSTEM

(75) Inventors: Harri Holma, Helsinki (FI); Hannu Häkkinen, Helsinki (FI)

(73) Assignee: Nokia Corporation, Espoo (FI)

( * ) Notice: Subject to any disclaimer, the term of this patent is extended or adjusted under 35 U.S.C. 154(b) by 1361 days.

(21) Appl. No.: 11/149,148

(22) Filed: Jun. 10, 2005

(65) Prior Publication Data

US 2006/0171349 A1 Aug. 3, 2006

(30) Foreign Application Priority Data

Feb. 1, 2005 (FI) ...................................... 20050114

(51) Int. Cl.
- H04B 17/00 (2006.01)
- H04B 7/00 (2006.01)
- H04W 4/00 (2009.01)
- H04B 1/66 (2006.01)
- H04N 7/12 (2006.01)

(Continued)

(52) U.S. Cl.
CPC ................ *H04L 1/22* (2013.01); *H04L 1/1845* (2013.01); *H04L 1/0026* (2013.01); *H04L 1/1812* (2013.01); *H04W 28/04* (2013.01)
USPC .... 455/522; 455/67.11; 370/332; 375/240.27

(58) Field of Classification Search
USPC ...................... 370/332, 333, 350; 375/240.27; 455/423, 456.2, 502, 522, 524, 67.11
See application file for complete search history.

(56) References Cited

U.S. PATENT DOCUMENTS

| 6,529,561 | B2 * | 3/2003 | Sipola ........................... 375/295 |
| 6,665,283 | B2 * | 12/2003 | Harris et al. .................. 370/333 |

(Continued)

FOREIGN PATENT DOCUMENTS

| EP | 0698975 B1 | 2/1996 |
| EP | 1 207 709 A1 | 5/2002 |

(Continued)

OTHER PUBLICATIONS

Toskala et al. "High Speed Downlink Packet Access" (pp. 307-345) from "WCDMA for UMTS, Radio Access for Third Generation Mobile Communications", Wiley & Sons, Ltd. (third edition) (2004).

(Continued)

*Primary Examiner* — Andrew Wendell
(74) *Attorney, Agent, or Firm* — Squire Patton Boggs (US) LLP

(57) ABSTRACT

A communications system where data blocks from a communications device are received at least in a serving site over a wireless interface. The serving site typically checks whether data blocks have been correctly received and sends acknowledgement information to the communications device accordingly. An assisting site may also receive the data blocks and send information indicating whether data blocks have been correctly received in the assisting site. In this case, the serving site may request erroneously received information from the assisting site. Alternatively, the assisting site may send information indicating erroneous reception of data blocks in response to noticing a data block sent by the communications device. As a further alternative, the assisting site may be synchronized with the data blocks sent by the communications device and send quality information relating to the wireless interface between the communications device and the assisting site to the serving site.

21 Claims, 11 Drawing Sheets

(51) Int. Cl.
*H04N 11/02* (2006.01)
*H04N 11/04* (2006.01)
*H04L 1/22* (2006.01)
*H04L 1/18* (2006.01)
*H04L 1/00* (2006.01)
*H04W 28/04* (2009.01)

(56) References Cited

U.S. PATENT DOCUMENTS

2004/0005882 A1 1/2004 Yoshii
2007/0160115 A1* 7/2007 Palanki et al. .............. 375/132

FOREIGN PATENT DOCUMENTS

| WO | WO 02/37872 A2 | 5/2002 |
| WO | WO 03/067953 A2 | 8/2003 |
| WO | 2004091114 A1 | 1/2004 |

OTHER PUBLICATIONS

Supplementary European Search Report issued Jun. 7, 2011 in corresponding EP05807901.3.

* cited by examiner

PROCESSING OF UPLINK DATA IN A COMMUNICATIONS SYSTEM

BACKGROUND OF THE INVENTION

1. Field of the Invention

The present invention relates to processing of data in a communications system. In particular the present invention relates to processing of data received from a communications device over a wireless interface.

2. Description of the Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for user equipment are known. Cellular communication systems are configured to have a cell structure, and typically they support communication with user equipment changing locations (mobile users). The support for communications for mobile users may include support for handing existing connections from one cell to another cell. At least routing of calls or communications for a mobile user in a new cell is typically supported in cellular systems. Some examples of a cellular system are the Global System for Mobile Telecommunications (GSM) and General Packet Radio Service (GPRS). GPRS provides packet-switched data services and utilizes the infrastructure of a GSM system. Further examples of a cellular system are third generation telecommunication systems, which typically support both packet-switched and circuit-switched data transfer. The Wideband Code Division Multiple Access (WCDMA) system is one example of a third generation cellular telecommunication system.

For illustrating packet-switched services in cellular system, the WCDMA system is used below as an example. It is, however, appreciated, that similar concepts may be found also in other cellular systems supporting packet-switched services.

FIG. 1 illustrates schematically, as an example of a cellular network supporting packet-switched services, a WCDMA network 100. Only some of the network elements of a WCDMA network are illustrated in FIG. 1. The radio access network 110 comprises a number of a radio network controllers (RNC) 116 and a number of base transceiver stations (BS) 114. Base stations are often called Node B's in connection with the WCDMA. A communications device 101, typically called a mobile station (MS) or user equipment (UE), communicates with a base transceiver station 114 over a radio interface. The packet-switched core network 120 of the system 100 comprises a number of GPRS Supporting Nodes (GSN) 122. Each mobile station registered for packet-switched services has a serving GSN, called SGSN, which is responsible for controlling the packet-switched connections to and from the mobile station. The packet-switched core network 120 is typically connected to further packet-switched networks via a Gateway GSN 124 (GGSN).

FIG. 2 shows, as an example of user plane protocol stacks, a protocol stack 201 for a communications device 101, a protocol stack 214 for the transceiver station 114, and protocol stacks 216a, 216b for a drift radio network controller and for a serving radio network controller. FIG. 2 also shows a protocol stack 222 for a serving GSN 122 and a protocol stack 224 for the GGSN 124. Even without a detailed discussion of the protocols mentioned in FIG. 2, it is possible to see that the protocol stacks reflect the hierarchical structure of a cellular communication system. Consider, as an example, the protocol stack 201 of the communications device 101 and the network element where the other endpoint of a logical protocol connection is. For the lowest protocol layer (physical layer PHY) in the protocol stack 201 the other endpoint is the base transceiver station 114. This is also true for part of medium access control (MAC) layer in the protocol stack 201 (see discussion below in connection with High-speed packet access). For higher protocol layers (part of physical layer, MAC layer, Radio Link Control (RLC) and L3 layer) in the protocol stack 201, the other endpoint is the serving RNC. For the Internet Protocol (IP) layer, the other endpoint is the GGSN.

In WCDMA the access technique is based on code division and same frequency ranges can be used by neighboring base transceiver stations. In principle, data transfer may occur between a communications device and one or more than one base transceiver stations. The base transceiver station(s) with which a communications device is communicating typically depends on the radio link quality between the communications device and the base transceiver stations nearby. When signals sent by a communications device are processed by a number of base transceiver stations, diversity combining of the received signals may be used to increase data transmission quality and throughput. Similarly, in the downlink direction transmission diversity schemes may be used.

Packet data transmission is supported by dedicated channels (DCHs), by shared channels (more specifically by a Downlink-shared Channel DSCH) and by a Forward Access channel, which is carried on a common control physical channel, already in the early releases of WCDMA specifications. To increase downlink packet data transfer capacity, a concept called High-speed Downlink Packet Access (HSDPA) has been designed by the Third Generation Partnership Project (3GPP) for the WCDMA system. HSDPA is discussed, for example, in Chapter 11 in *WCDMA for UMTS*, Third edition, Eds. Harri Holma and Antti Toskala, Wiley and Sons, 2004.

In HSDPA the packet data throughput is increased by using techniques such as link adaptation and fast physical layer (L1) retransmission combining. The logical channel for downlink user data is called High-speed Downlink Shared Channel (HS-DSCH) in HSDPA. For sending acknowledgment information (AKC/NACK) relating to L1 retransmission and quality feedback information, there is defined a specific uplink control channel. The endpoint of this uplink control channel are a communications device and a base transceiver station (not a radio network controller).

In HSDPA, diversity combining is not used in the downlink direction in connection with the HS-DSCH. This is because the advanced link level techniques in HS-DSCH can tolerate fading and the macro diversity combining is not necessary. HSDPA also supports cell change where the HS-DSCH transmission is changed from one cell to another. That process takes typically a few hundreds of milliseconds. The control channel DPCCH associated with the shared data channel HS-DCSH uses soft handover (diversity combining).

For supporting an increased packet data transfer capacity also in the uplink direction, an uplink shared channel for packet data may also be defined. A concept called High-speed Uplink Packet Access (HSUPA) has been standardized as part of 3GPP Release 6. The work item was called Enhanced uplink DCH. In the uplink direction there is typically need for diversity combining for ensuring a sufficiently high quality and reliability of data transfer and for controlling interference. Diversity combinining is also needed for ensuring reliable data transfer for handover situations (soft handovers). In the proposed HSUPA concept, two base transceiver stations process the signals received from a communications device and the processed information is then combined in a serving radio network controller.

In addition to cellular communications system having a similar hierarchy than the hierarchy of base transceiver stations, radio network controllers and GPRS support nodes, wireless communications are provided by non-cellular communication systems. One solution is to connect transceiver network elements directly to a packet-switched network and use protocols similar to those in fixed packet-switched networks also for providing the wireless packet data access. One example of these non-cellular wireless networks is the Wireless Local Area Network (WLAN). basic mobility support may be provided, for example, based on the Mobile IP protocol. Cellular communication systems, however, are typically able to support mobility in a more enhanced manner than non-cellular wireless communication systems. Cellular communications systems, for example, support continuous connections to a mobile communications device. Changing the access point from one transceiver network element to another typically causes an interruption to a connection in non-cellular communication systems. A further advantage of cellular communication systems is that they typically have versatile authentication, accounting and authorization schemes implemented therein.

A network architecture with less hierarchy levels is often more easily scalable than a network architecture with more hierarchy levels. The various protocols and network elements in a hierarchical network architecture may in some cases cause delays, which degrade an end-user experience. Simplification of the hierarchical communication system, especially in connection with packet data transfer, may thus provide some advantages.

On the other hand, certain functionality and interfaces between network elements and between a communications device and the cellular communications system are typically defined in the relevant specifications for the cellular communications systems. Therefore the standardized functionality and features have to be taken into account when envisaging changes to the cellular network architecture.

Considering the high-speed packet access in the uplink direction, there are open questions relating to how to support a change from one base transceiver station to another in connection with a distributed (non-hierarchical) network architecture and how to support diversity combining. As mentioned above, the current 3GPP specifications define a soft handover, where two base transceiver stations receive and process signals sent by a communications device and the processed signals are diversity combined in a radio network controller. Should the network be implemented differently than shown in FIG. 1, the communications device should not need modifications.

It is appreciated that although above reference is made mainly to the HSDPA/HSUPA and to the WCDMA system, the problems may be relevant also for other communication systems.

SUMMARY OF THE INVENTION

A first aspect of the invention relates to a method for processing data in a communications system, the method comprising
receiving data blocks from a communications device in a first transceiver network element over a wireless interface,
checking whether data blocks has been correctly received, and
requesting from a second transceiver network element at least part of at least one data block corresponding to at least one erroneously received data block.

A second aspect of the invention relates to a method for processing data in a communications system, the method comprising
receiving data blocks from a communications device in a second transceiver network element over a wireless interface,
receiving a request to send at least part of at least one data block to a first transceiver network element, and
sending said at least part of at least one data block to the first transceiver network element from the second transceiver network element.

A third aspect of the invention relates to a transceiver network element for a communications system, comprising
means for receiving data blocks from a communications device over a wireless interface,
means for checking whether data blocks have been correctly received, and
means for requesting from a further transceiver network element at least part of at least one data block corresponding to at least one erroneously received data block, when the transceiver network element is configured to act as a serving transceiver network element for the communications device.

A fourth aspect of the invention relates to a transceiver network element for a communications system, comprising
means for receiving data blocks from a communications device over a wireless interface,
means for receiving a request to send at least part of at least one data block to a further transceiver network element, and
means for sending said at least part of at least one data block to the further transceiver network element.

A fifth aspect of the invention relates to an adapter for a transceiver network element, the adapter comprising
means for requesting, when the transceiver network element is configured to act as a serving transceiver network element for a communications device, from a further transceiver network element at least part of at least one data block corresponding to at least one erroneously received data block, wherein the at least on erroneously received data block has been sent by the communications device and received in the transceiver network element over a wireless interface.

A sixth aspect of the invention relates to an adapter for a transceiver network element, the adapter comprising
means for receiving a request to send at least part of at least one data block to a further transceiver network element, and
means for sending said at least part of at least one data block to the further transceiver network element.

A seventh aspect of the invention relates to a communications system comprising
means for receiving data blocks from a communications device in a first transceiver network element over a wireless interface,
means for checking whether data blocks have been correctly received in the first transceiver network element,
means for requesting from a second transceiver network element at least part of at least one data block corresponding to at least one erroneously received data block, when the first transceiver network element is configured to act as a serving transceiver network element for the communications device, and
means for sending said at least part of at least one data block to the first transceiver network element from the second transceiver network element.

An eighth aspect of the invention relates to a method for processing data in a communications system, the method comprising receiving data blocks from a communications device in a first transceiver network element over a wireless interface, sending information indicating whether data blocks have been correctly received in the first transceiver network element to the communications device, and determining whether there is need to change reception of data blocks sent by the communications device from the first transceiver network element to a second transceiver network element, the second transceiver network element currently sending information indicating erroneous receipt of data blocks to the communications device in response to noticing a data block sent by the communications device.

A ninth aspect of the invention relates to a method for processing data in a communications system, the method comprising noticing in a second transceiver network element a data block sent by a communications device over a wireless interface, and sending information indicating erroneous receipt of data block to the communications device from the second transceiver network element in response to noticing a data block sent by the communications device.

A tenth aspect of the invention relates to a transceiver network element for a communications network, comprising means for receiving data blocks from a communications device over a wireless interface, means for sending information indicating whether data blocks have been correctly received to the communications device, when the transceiver network element is configured to act as a serving transceiver network element for the communications device, and means for determining whether there is need to change reception of data blocks sent by the communications device to a second transceiver network element, the second transceiver network element configured to send information indicating erroneous receipt of data blocks to the communications device in response to noticing a data block sent by the communications device.

An eleventh aspect of the invention relates to a transceiver network element for a communications system means for noticing a data block sent by a communications device over a wireless interface, and means for sending information indicating erroneous receipt of data block to the communications device from the transceiver network element in response to noticing a data block sent by the communications device, when the transceiver network element is configured to act as an assisting transceiver network element for the communications device.

A twelfth aspect of the invention relates to an adapter for a transceiver network element, the adapter comprising means for sending information indicating whether data blocks have been correctly received in the transceiver network element to a communications device, when the transceiver network element is configured to act as a serving transceiver network element for the communications device, and means for determining whether there is need to change reception of data blocks sent by the communications device to a second transceiver network element, the second transceiver network element configured to send information indicating erroneous receipt of data blocks to the communications device in response to noticing a data block sent by the communications device.

A thirteenth aspect of the invention relates to an adapter for a transceiver network element, the adapter comprising means for sending information indicating erroneous receipt of data block to a communications device in response to noticing a data block sent by the communications device, when the transceiver network element is configured to act as an assisting transceiver network element for the communications device.

A fourteenth aspect of the invention relates to a communications system, comprising means for receiving data blocks from a communications device in a first transceiver network element over a wireless interface, means for sending information indicating whether data blocks have been correctly received from the first transceiver network element to the communications device, means for noticing data blocks sent by the communications device in a second transceiver network element, means for sending information indicating erroneous receipt of data block to the communications device from the second transceiver network element in response to noticing a data block sent by the communications device, and means for determining whether there is need to change reception of data blocks sent by the communications device to the second transceiver network element.

A fifteenth aspect of the invention relates to a method for processing data in a communications system, the method comprising receiving data blocks from a communications device in a first transceiver network element over a wireless interface, sending information indicating whether data blocks have been correctly received to the communications device, receiving information indicating quality of a wireless interface between the communications device and a second transceiver network element, and determining whether there is need to change reception of data blocks from the communications device to the second transceiver network element, the second transceiver network element being currently synchronized with data blocks sent from the communications device.

A sixteenth aspect of the invention relates to a method for processing data in a communications system, the method comprising noticing data blocks sent by a communications device in a second transceiver network element over a wireless interface, synchronizing the second transceiver network element with the received data blocks, determining quality of the wireless interface from the communications device to the second transceiver network element, and sending information indicating quality of the wireless interface to a first transceiver network element, the first transceiver network element currently acting as a serving transceiver network element for the communications device.

A seventeenth aspect of the invention relates to a transceiver network element for a communications system, comprising means for receiving data blocks from a communications device over a wireless interface, means for sending information indicating whether data blocks have been correctly received to the communications device, means for receiving information indicating quality of a wireless interface between the communications device and a second transceiver network element, and means for determining whether there is need to change reception of data blocks from the communications device to the second transceiver network element, the second transceiver network element configured to be synchronized with data blocks sent from the communications device.

An eighteenth aspect of the invention relates to a transceiver network element for a communications system, comprising means for noticing data blocks sent by a communications device over a wireless interface, means for synchronizing the transceiver network element with the received data blocks, means for determining quality of the wireless interface from the communications device to the transceiver network element, and means for sending information indicating quality of the wireless interface to a first transceiver network element, the first transceiver network element currently acting as a serving transceiver network element for the communications device.

A nineteenth aspect of the invention relates to an adapter for a transceiver network element, comprising means for receiving information indicating quality of a wireless interface between the communications device and a second transceiver network element, and means for determining whether there is need to change reception of data blocks sent by the communications device from the transceiver network element to the second transceiver network element, the second transceiver network element configured to be synchronized with data blocks sent from the communications device.

A twentieth aspect of the invention relates to an adapter for a transceiver network element, comprising means for noticing data blocks sent by a communications device over a wireless interface, means for synchronizing the transceiver network element with the received data blocks, means for determining quality of the wireless interface from the communications device to the transceiver network element, and means for sending information indicating quality of the wireless interface to a first transceiver network element, the first transceiver network element currently acting as a serving transceiver network element for the communications device.

A twenty-first aspect of the invention relates to a communications system, comprising means for receiving data blocks from a communications device in a first transceiver network element over a wireless interface, means for sending information indicating whether data blocks have been correctly received in the first transceiver network element to the communications device, means for receiving in the first transceiver network element information indicating quality of a wireless interface between the communications device and a second transceiver network element, means for determining whether there is need to change reception of data blocks from the communications device to the second transceiver network element, means for noticing data blocks sent by the communications device in a second transceiver network element, means for synchronizing the second transceiver network element with the received data blocks, means for determining quality of the wireless interface from the communications device to the second transceiver network element, and means for sending information indicating quality of the wireless interface to the first transceiver network element.

A twenty-second aspect of the invention relates to a method for processing data in a communications system, the method comprising receiving data blocks from a communications device in a first transceiver network element over a wireless interface, sending power control commands to the communications device from the first transceiver network element based at least on a quality of the data blocks received in the first transceiver network element, receiving the data blocks in a second transceiver network element over a wireless interface, sending power control commands to the communications device from the second transceiver network element based at least on the quality of the data blocks received in the second transceiver network element, checking whether data blocks has been correctly received in the first transceiver network element, and requesting from the second transceiver network element at least part of at least one data block corresponding to at least one erroneously received data block.

A twenty-third aspect of the invention relates to a method for processing data in a communications system, the method comprising receiving data blocks from a communications device in a first transceiver network element over a wireless interface, sending power control commands to the communications device from the first transceiver network element based at least on a quality of the data blocks received in the first transceiver network element, receiving the data blocks sent by the communications device in a second transceiver network element over a wireless interface, sending power control commands to the communications device from the second transceiver network element based at least on the quality of the data blocks received in the second transceiver network element, checking whether data blocks have been correctly received in the first transceiver network element, sending information indicating whether data blocks have been correctly received to the communications device from the first transceiver network element, and changing the transceiver network element checking whether data blocks have been correctly received and sending information indicating whether data blocks have been correctly received to be the second transceiver network element at the end of a data packet formed of a plurality of data blocks.

A twenty-fourth aspect of the invention relates to a method for processing data in a communications system, the method comprising receiving first data blocks from a communications device in a first transceiver network element over a wireless interface, sending power control commands to the communications device from the first transceiver network element based at least on a quality of the first data blocks received in the first transceiver network element, receiving the first data blocks sent by the communications device in a second transceiver network element over a wireless interface, sending power control commands to the communications device from the second transceiver network element based at least on the quality of the first data blocks received in the second transceiver network element, sending second data blocks to the communications device from the first transceiver network element, checking whether first data blocks have been correctly received in the first transceiver network element, sending information indicating whether first data blocks have been correctly received to the communications device from the first transceiver network element, and changing the transceiver network element responsible for checking whether first data blocks have been correctly received and for sending information indicating whether first data blocks have been correctly received to be the second transceiver network element when the transceiver network element sending second data blocks is changed to be the second transceiver network element.

BRIEF DESCRIPTION OF THE DRAWINGS

Embodiments of the present invention will now be described by way of example only with reference to the accompanying drawings, in which.

DETAILED DESCRIPTION OF EMBODIMENTS

Figure 1:
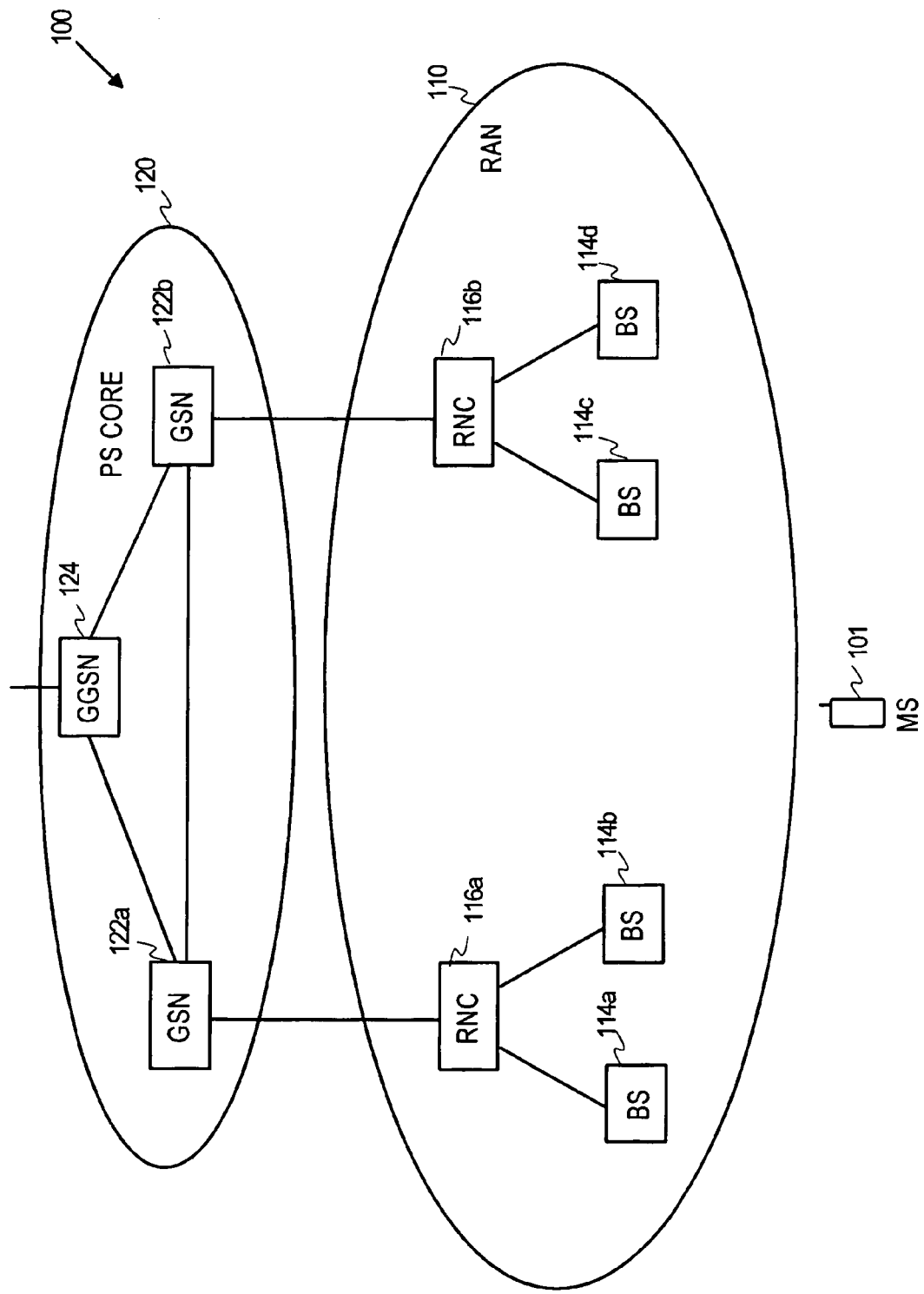
FIG. 1 shows, as an example, a cellular communication system in accordance with prior art.
Figure 2:
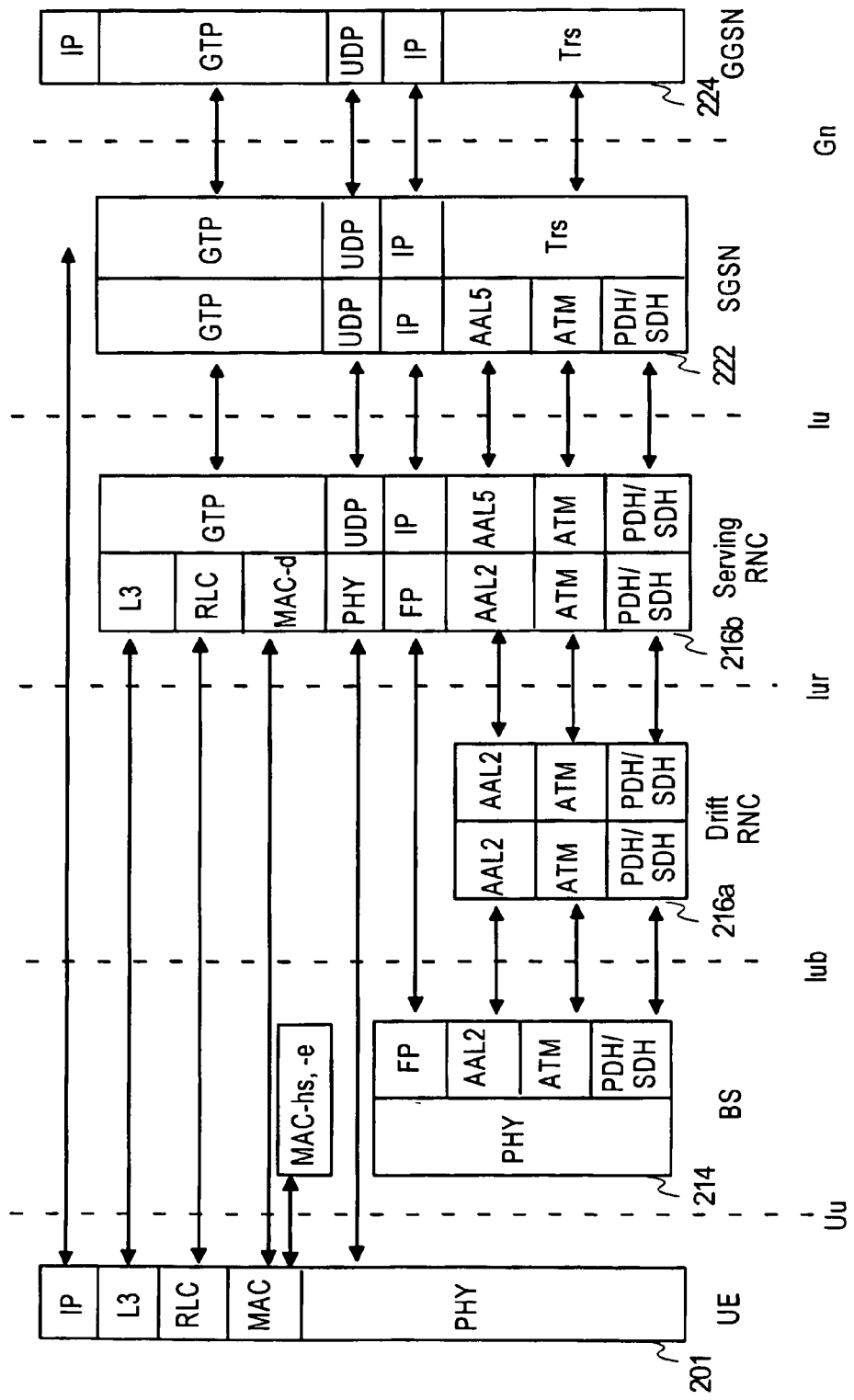
FIG. 2 shows, as an example, protocol stacks for the communications device and network elements shown in FIG. 1.

FIGS. 1 and 2 have been discussed above in connection with the prior art cellular communications systems.

Embodiments of the present invention address problems relating to uplink data processing in radio access networks where the applied multi-access technique allows re-use of radio frequencies in neighboring transceiver network elements. Typically the multi-access technique is based on code division. It is appreciated, however, that the invention may be applicable also in other communications systems.

The embodiments aim to match the following conditions for uplink packet data access. First, the radio access network has a distributed network architecture instead of a hierarchical network architecture. In other words, transceiver network elements may be connected directly to routers or other network elements supporting packet-switched data transfer. There typically is no central network element (like the radio network controller 116 in FIG. 1) which would receive information from various transceiver network elements and make decisions about uplink handovers and/or decisions about diversity combining. Second, the embodiments aim to use minimum amount of transmission capacity. Third, the embodiments aim to provide a proper interference control between transceiver network elements and a good radio link performance.

Figure 3:
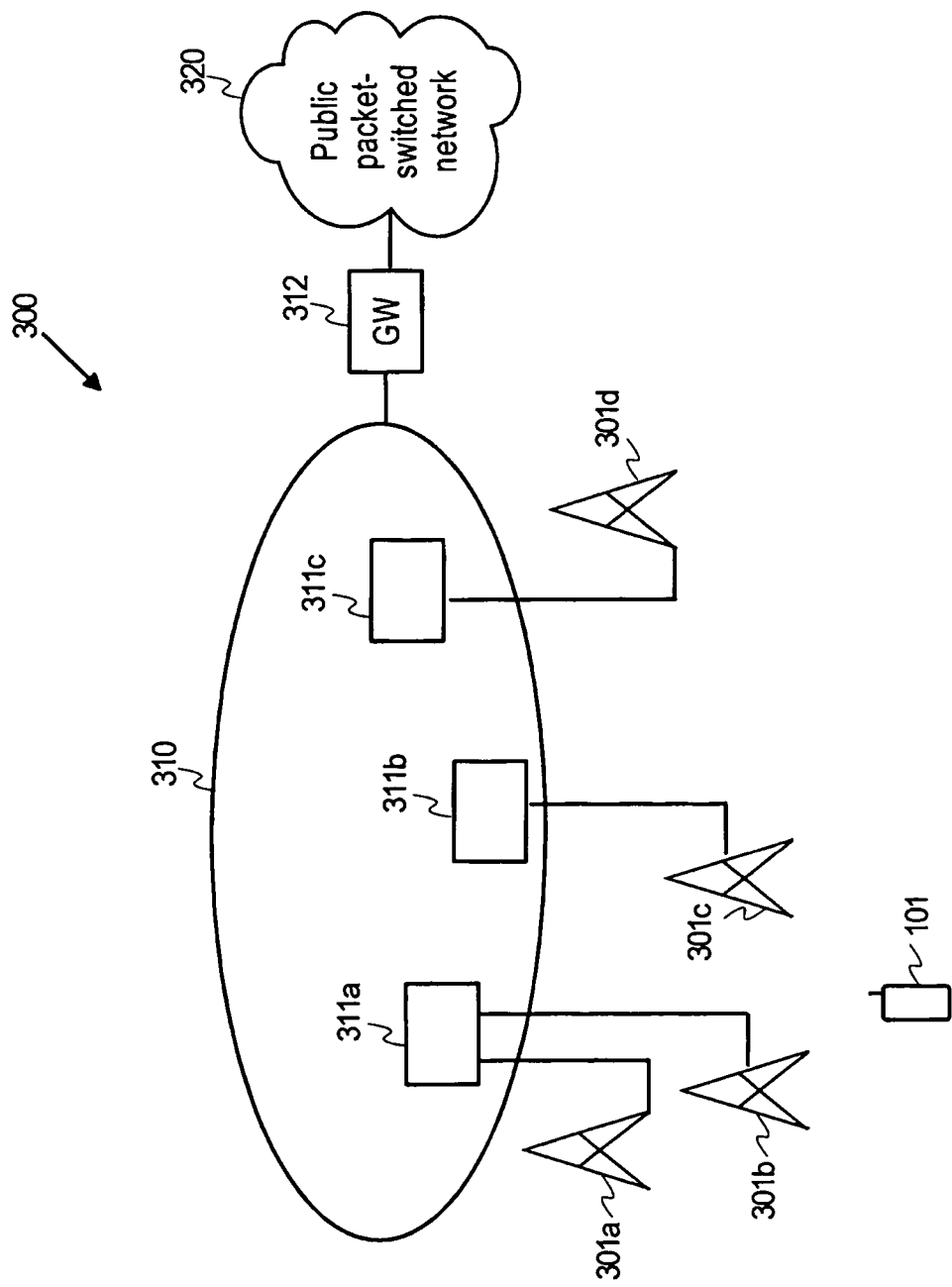
FIG. 3 shows, as an example, a communications system where embodiments of the inventions are applicable.

FIG. 3 shows, as an example, a radio access network 300 where a plurality of transceiver network elements 301 is connected to a packet-switched network 310 which typically includes a plurality of routers 311. The transceiver network elements 301 are connected to routers 311, and the routers 311 provide packet-switched connectivity between the transceiver network elements 301. The link level connectivity between the transceiver network elements 301 and routers 311 may be provided, for example, by Asynchronous Transfer Mode (ATM) connections, or by radio or microwave links. The packet-switched network is typically connected via a gateway network element 312 to public data network 320 and/or to other data networks.

In the following embodiments of the invention are discussed in some detail. In general, embodiments of the present invention may be applicable to any data transfer from a communication device where retransmissions are used, especially in non-hierarchical wireless communication systems.

Two specific examples of uplink channels, where embodiments of the invention are applicable, are HSUPA and 3 GPP Release 99 uplink channels. In HSUPA, power control and re-transmissions of low protocol layer data blocks are in use between a communications device and a transceiver network element. A low protocol layer refers here typically to physical layer or medium access control layer data blocks. In 3GPP Release 99 uplink channels, link layer retransmissions (RLC retransmissions) are used.

In HSDPA and HSUPA fast re-transmission of data blocks are implemented using Hydrid Automatic Repeat reQuest (HARQ). The HARQ scheme combines forward error correction (FEC) and Automatic Repeat reQuest (ARQ). In HARQ, a receiver acknowledges a successfully received frame with an ACK message. Upon receipt of ACK, the transmitter knows that retransmissions are unnecessary. If a frame is received in error, the receiver sends a negative acknowledgement NACK to the transmitter and saves the received symbols. The transmitter consequently retransmits the frame. The receiver receives second symbols relating to the retransmitted frame, and soft-combines the stored first symbols and the received second symbols. This soft-combining reduces the error rate of the retransmitted frames, as previously received information relating to the same frame is employed. In HARQ, the retransmission may be identical and this is often referred to as soft-combining. Alternatively, the transmissions may not be identical. In this case the principle of incremental redundancy is used. Adaptive HARQ is a version of HARQ, where the data rate for each transmission and each retransmission may be adapted. In non-adaptive HARQ, the method for selecting the data rates in each retransmission is the same as that for selecting the data rates in each initial transmission.

In the following description, data blocks refer to a set of data blocks relating to each other, for example data blocks sent on a certain uplink channel or data blocks relating to a certain connection.

Figure 4A:
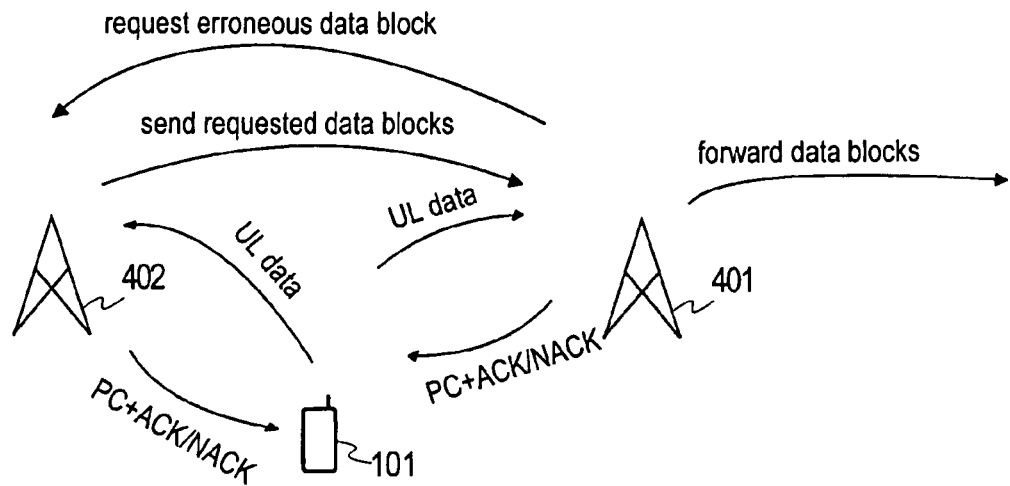
FIG. 4a shows schematically functionality in accordance with a first embodiment of the invention.

FIG. 4a shows schematically functionality in accordance with a first embodiment of the invention. A communications device 101 is sending data in the uplink direction. A first transceiver network element 401 and a second transceiver network element 402 are receiving data blocks and acknowledging successful receipt of the data blocks. As specific example, the data blocks may be sent on the HSUPA channel and HARQ may be used for acknowledging receipt of data blocks or the data blocks may be sent on a 3GPP Release 99 channel with link layer retransmissions. In principle, the communications device 101 should not retransmit a data block which is acknowledged by at least one transceiver network element. Both the first and the second transceiver network elements 401, 402 may send power control commands to the communications device 101. The communications device 101 adjusts the transmission power of the data blocks in accordance with the power control commands it receives.

The first transceiver network element 401 in FIG. 4a acts as a serving transceiver network element, and it performs macro diversity combining of data blocks. For HSUPA, the data blocks are MAC data blocks. If some data blocks are not correctly received by the serving transceiver network element 401, it requests these data blocks (or at least parts of these data blocks) from the second transceiver network element 402. By requesting from the second transceiver network element 402 data blocks which have been erroneously received in the first transceiver network element 401 transmission resources between the transceiver network elements 401 and 402 are used more efficiently than by automatically sending all received data blocks from the second transceiver network element 402. Requested data blocks between the transceiver network elements 401 and 402 are typically sent in IP packets or using other packet data protocols. A serving transceiver network element 401 may request only a part of a data block that was received erroneously from the communications device 101 from the second transceiver network element 402. Upon receiving the requested part of a data block, the serving transceiver network element 401 may combine the information received from the communications device 101 and from the transceiver network element 402 and obtain a correct data block. Should the second network element 402 not have received the requested (part of a) data block, upper layer re-transmission, for example, may be used for receiving the information correctly from the communications device 101.

It is appreciated that although FIG. 4a shows one transceiver network element 402, there may be more than one transceiver network element (in addition to the serving transceiver network element 401) receiving data blocks from the communications device 101 and sending acknowledgement information relating to the received data blocks to the communications device 101.

It is appreciated that the serving transceiver network element is typically changed from the transceiver network element 401 to one of the second transceiver network elements 402, in other words to one of the transceiver network elements with the active set. Any changes to active set are typically performed in between carrying out changes of the serving transceiver network element.

Referring to the features of the embodiments of the invention, the active set of the communications device 101 refers to those transceiver network elements which send acknowledgment information to the communications device 101 relating to the uplink data blocks and which also typically send power control commands to the communications device.

Figure 4B:
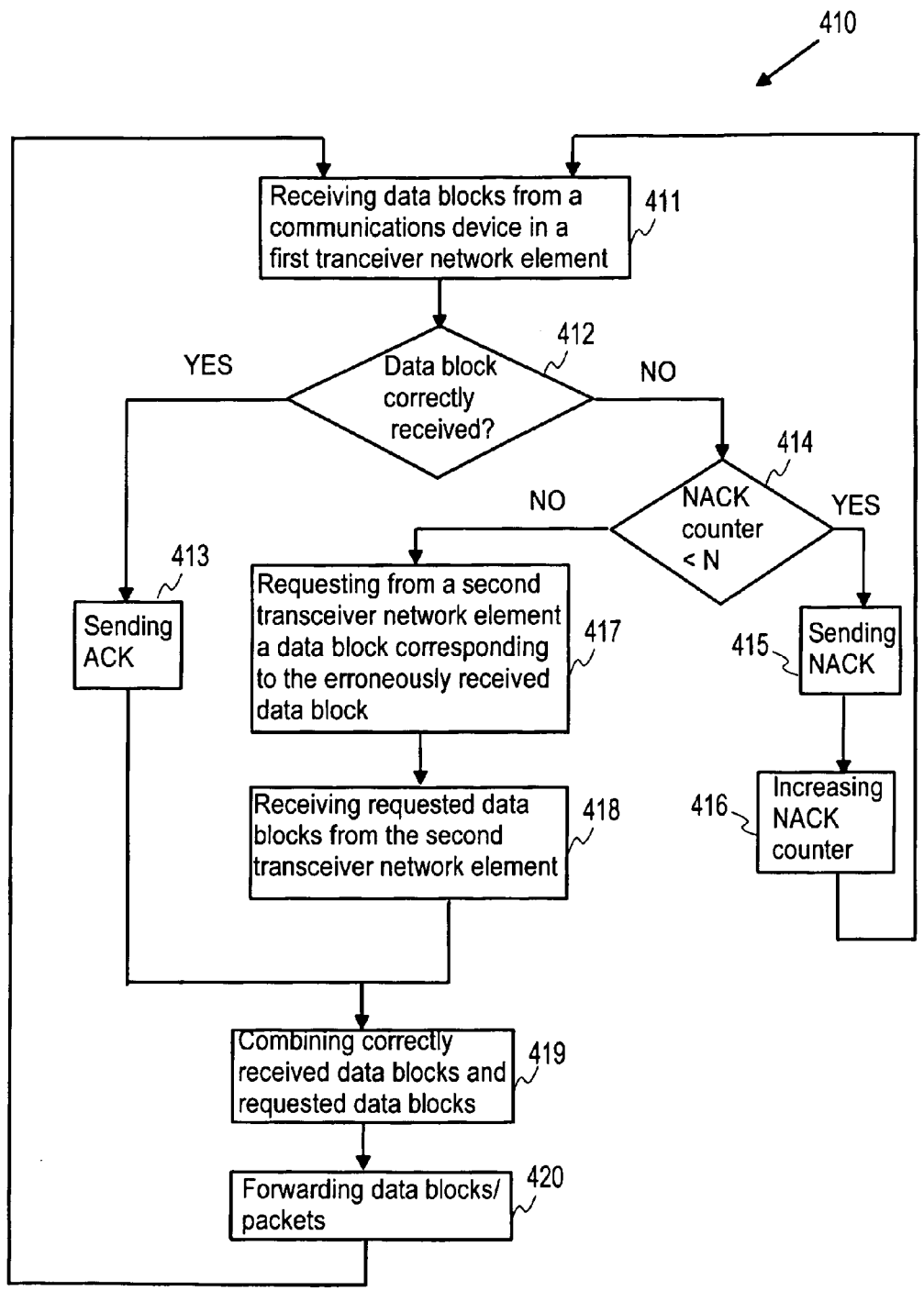
FIG. 4b shows, as an example, a flowchart of one method of operating a serving transceiver network element in accordance with the first embodiment.

FIG. 4b shows, as an example, a flowchart of a method 410 of operating a serving transceiver network element 401. It is appreciated that only those steps, which are important for understanding the principle of the invention are shown in this flowchart and other appended flowcharts. It is also appreciated that the order of the steps may vary from the order shown in the flowcharts. Regarding the logic of sending AKC and NACK messages, it is appreciated that the appended flowcharts are intended to be only examples. For example, various details of HARQ are not discussed in connection with the appended flowcharts.

The method 410 relates to processing data block in a serving transceiver network element 401. In step 411 a data block is received from the communications device 101. The data block may be sent on a HSUPA channel. In step 412 it is checked whether the data block is correctly received. If the data block is correctly received, an acknowledgement ACK is sent to the communications device in step 413. If the data block is not correctly received, a non-acknowledgement NACK is sent in step 415, if the NACK counter for this data block is below a predefined limit N. Thereafter the NACK counter for this data block is increased in step 416. If the data block has already been retransmitted the maximum number of times and the NACK counter is equal to a predefined limit, a data block corresponding to the erroneously received data block or a part of that data block is requested from a second transceiver network element 402 in step 417. In step 418, the requested (part of) data block is received from the second transceiver network element 402 in the serving network element 401. As mentioned above, if the second transceiver network element 402 has not received the requested (part of a) data block, upper layer retransmissions may be triggered at this point. In step 419 the serving transceiver network element combines correctly received data blocks and requested data blocks. In step 420 data blocks or upper protocol layer data packets formed of the data blocks (excluding lower level protocol headers) are forwarded from the serving transceiver network element 401 towards the communications system.

Figure 4C:
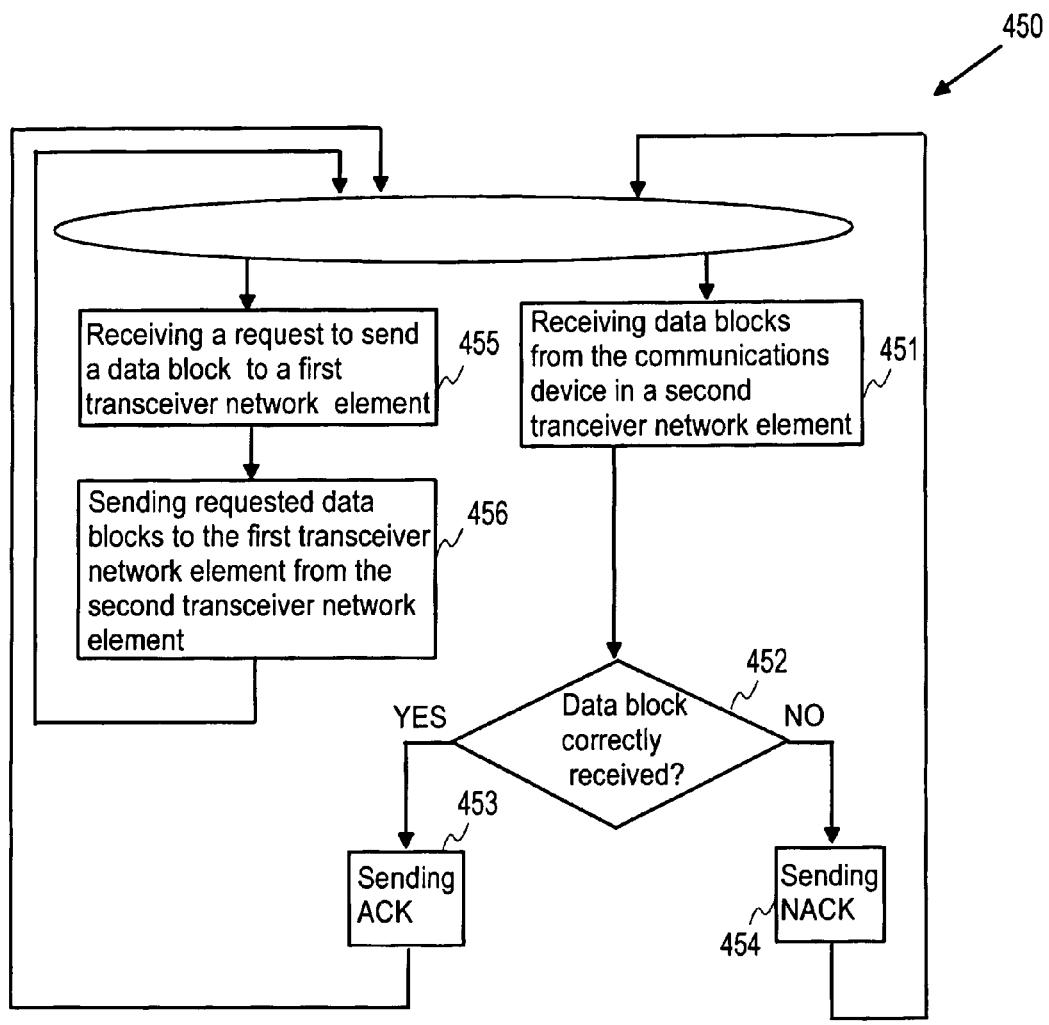
FIG. 4c shows, as an example, a flowchart of one method of operating an assisting transceiver network element in accordance with the first embodiment.

FIG. 4c shows, as an example, a flowchart of a method 450 of operating an assisting transceiver network element 402. When a data block from the communications device is received in step 451, it is checked in step 452 whether the data block is correctly received. Similarly as in the method 410, an acknowledgement is sent in step 453 or a non-acknowledgement is sent in step 454. By way of an example, the method 450 contains no check relating to the NACK counter values, as the serving transceiver network element 401 may be responsible for triggering upper layer retransmissions in response to not receiving requested data blocks from the transceiver network element 402. When a request to send a data block to a first transceiver network element 401 is received in step 455, the requested data block is sent in step 456 to the first transceiver network element 401, if it has been correctly received in the second transceiver network element 402.

It is appreciated that although the flowcharts in FIGS. 4b and 4c do not explicitly refer to sending of power commands, the serving transceiver network element 401 and the second transceiver network element(s) 402 typically control the transmission power used by the communications device 101 for transmitting the data block.

Figure 5A:
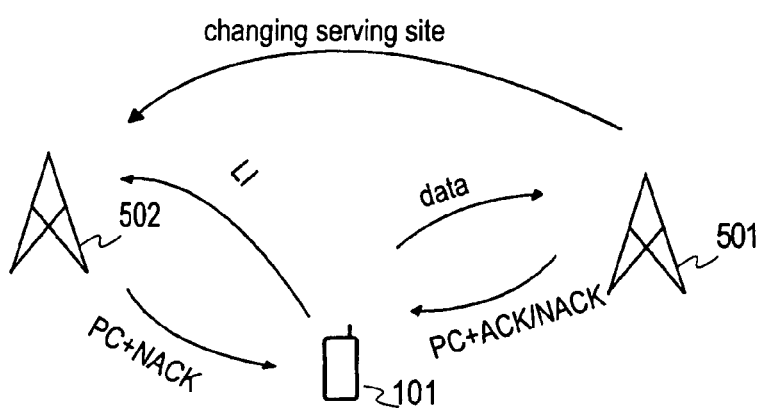
FIG. 5a shows schematically functionality in accordance with a second embodiment of the invention.

FIG. 5a shows schematically functionality in accordance with a second embodiment of the invention. In this second embodiment, there is no diversity combining. There is one serving transceiver network element 501, which receives data blocks from the communications device 101 and sends acknowledgement information to the communications device 101. There are one or more transceiver network elements 502, which listen to the data blocks sent by the communications device 101 and which send negative acknowledgements to the communications device irrespectively of the correctness of received data blocks. As discussed above in connection with the first embodiments, also in this second embodiment the active set typically consists of the first transceiver network element 501 and of the second transceiver network element(s) 502. Change of the serving transceiver network element is carried out typically within the active set. In other words, change of the serving transceiver network elements takes place from the first transceiver network element 501 to (one of) the second transceiver network element(s) 502.

It is appreciated that the transceiver network element 502 need not properly process the data blocks and determine whether transmission errors have occurs in connection with the data blocks. It is sufficient that the transceiver network element 502 sends negative acknowledgement information in response to noticing a data block sent by the communications device 101. Therefore the term noticing a data block is used for the transceiver network element 502 instead of receiving data blocks. In practice the signal sent by a communications device 101 is demodulated in the second transceiver network element 502 for noticing a data block sent by the communications device 101.

In a first alternative of the second embodiment of the invention, the serving transceiver network element is typically changed at the end of a data packet, a data packet consisting of a plurality of data blocks (excluding, for example, header information). This way complete data packets may be forwarded from the serving transceiver network element further to the communications system. If a need to change the serving transceiver network element is noticed when only some data blocks relating to a data packet have been received, the already received data blocks may be transmitted from the current serving transceiver network element to the new serving transceiver network element. If the communications system (the serving transceiver network element) decides to change the serving transceiver network element, no modifications are typically needed in the communications device.

It is appreciated that the change of the serving transceiver network element may be performed each time an end of a data packet is encountered. If the change of the serving transceiver network element at the end of each data packet is initiated by the communications device, functionality of the communications device typically needs to be modified accordingly. It is appreciated that a change of a serving network element initiated by the communications device is often called a cell reselection. It is possible that the network is responsible for initiating change of the serving transceiver network element each time an end of a data packet is encountered. The change may be carried out in a fast manner, as there is no need to perform control signaling with the communications device 101. As an example, for transmitting an IP packet having the size of 1500 bytes at a transfer rate of 64 kbps, the transfer takes about 188 ms. The change of the serving site should take a couple of milliseconds to be feasible, and due to not needing signaling between the network and the communications device 101 this can be achieved.

The serving transceiver network element for the uplink data blocks may be changed to one of the second transceiver network elements 502. Typically the serving transceiver network element is changed when the currently serving transceiver network element 501 notices a need for the change. For example, there may be need to change the serving site if the communications device 101 cannot receive the acknowledgement information sent by the serving transceiver network element 501. This can be noticed by the communications device 101 retransmitting a data block after the serving transceiver network element 501 has acknowledged the data block. Alternatively or additionally, unsuccessful receipt of a data block despite the maximum number retransmission may indicate a need for relocating the serving transceiver network element. Furthermore, weak pilot signal levels of the serving transceiver network element reported by the communications device and/or too high error rates of the data blocks received from the communications device may trigger change of the serving site. Various ways to detect a need for a serving site change are known to a skilled person.

It is appreciated that the communications device 101 in the situation shown in FIG. 5a believes that it is in a soft handover. The communications device 101 need not know that only one of the transceiver network elements belonging to its active set is properly receiving and processing the data blocks sent by the communications device 101 and other transceiver network elements of the active set are sending just negative acknowledgements. There is thus no need to change functionality of a communications device that can perform a soft handover. Soft handover here refers to receiving acknowledgment information and typically also power control commands from more than one transceiver network element. By sending power control commands from all transceiver network elements of the active set in accordance with suitable power control procedures, the interference between the transceiver network elements can be properly controlled.

Figure 5B:
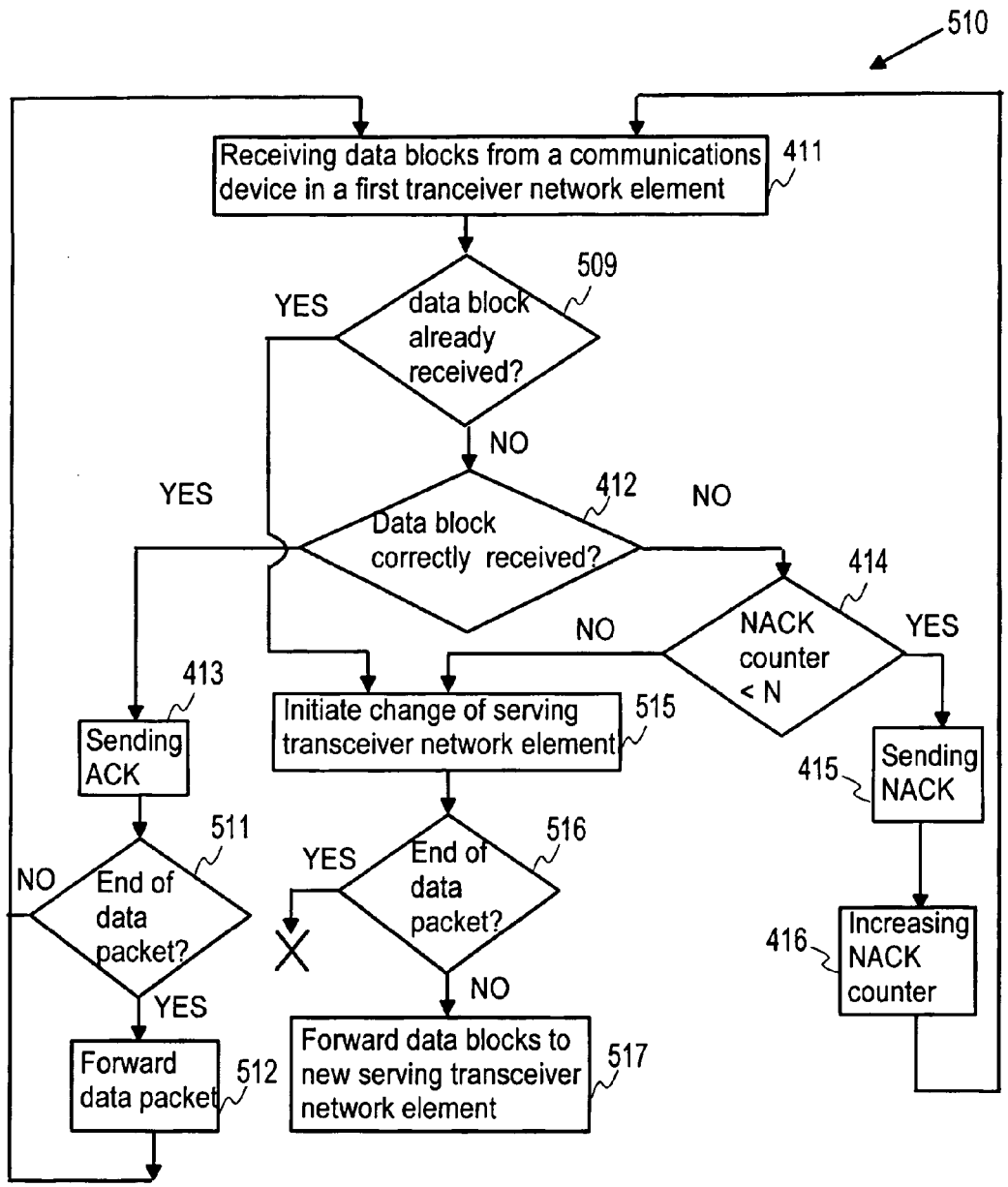
FIG. 5b shows, as an example, a flowchart of one method of operating a serving transceiver network element in accordance with the first alternative of the second embodiment.

FIG. 5b shows, as an example, a flowchart of a method 510 of operating a serving transceiver network element 501 in accordance with the first alternative of the second embodiment. Steps 411 to 416 are similar to steps in the method 410 in FIG. 4b. When a data block has been successfully received for the first time (steps 509, 412 and 413), it is checked whether an end of a data packet is encountered in step 511. If a data packet can be assembled from the data blocks received so far (it is possible that the data blocks are not successfully received in a correct order), the data packet is forwarded in step 512. Alternatively data blocks may be forwarded block by block, for example, in the order as they successfully arrive.

In the method 510 a need for changing the serving transceiver network element is noticed by steps 509 and 414. In step 509, when a data block has been received in step 411, it is first checked whether the data packet has already been received and acknowledged. If this is the case, the communications device 101 may not be able to receive the acknowledgements sent by the serving transceiver network element 501 and there may be need for initiating change of the serving transceiver network element to (one of) the second transceiver network elements 502 (step 515). If the change of the serving transceiver network entity is initiated in step 515, in step 516 it may be checked whether the end of a data packet has been encountered when processing the latest successfully received data block. If the end of a data packet has not been encountered, data blocks relating to an incompletely received data packet are forwarded to the new serving transceiver network element in step 517.

As discussed above, it is appreciated that alternatively or additionally other criteria than steps 509 and 414 may be used for noticing a need for a handover. Typically the transceiver network element 501 sends also power control commands to the communications device 101, although this is not explicitly mentioned in FIG. 5b.

Figure 5C:
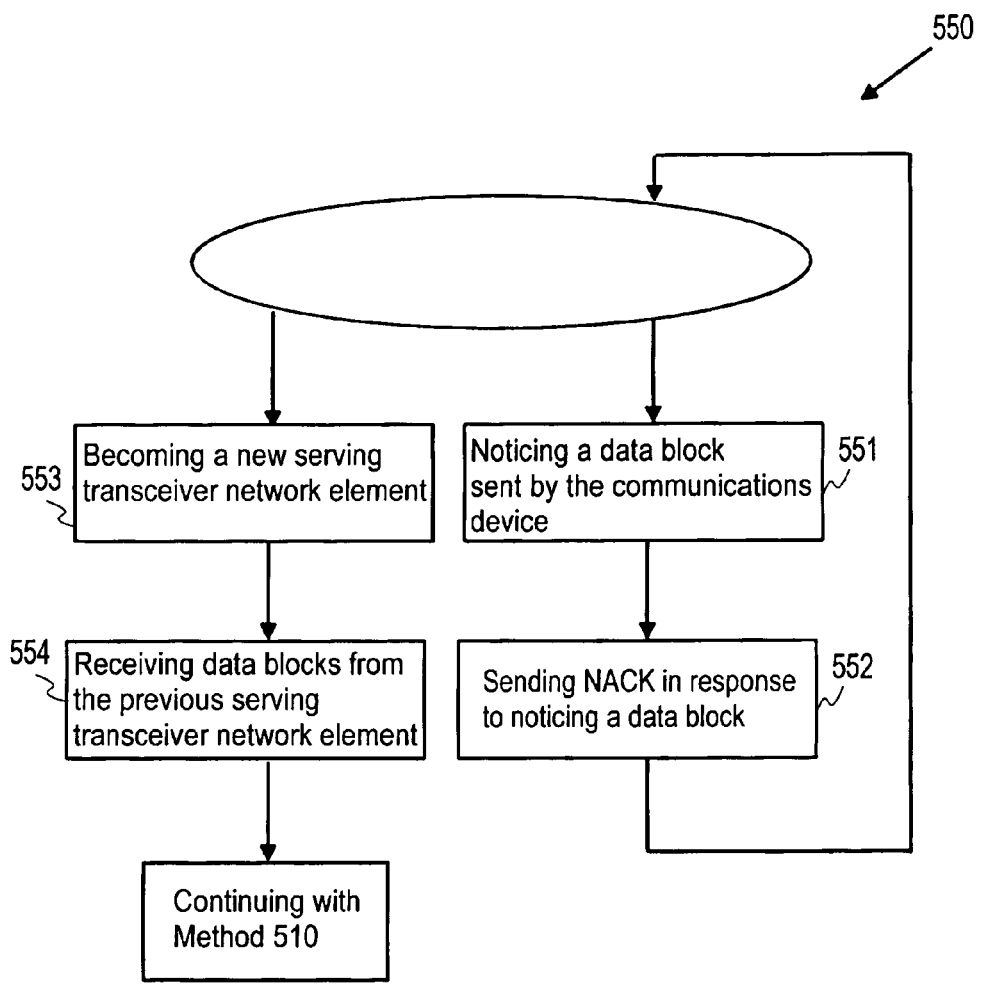
FIG. 5c shows, as an example, a flowchart of one method of operating an assisting transceiver network element in accordance with the first alternative of the second embodiment.

FIG. 5c shows, as an example, a flowchart of a method 550 of operating an assisting transceiver network element 502 belonging to the active set of the communications device. The transceiver network element 502 notices a data block sent by the communications device 101 (step 551). In response to noticing a data block sent by the communications device 101, negative acknowledgement information is sent to the communications device 101 (step 552). Typically the transceiver network element 502 sends also power control commands to the communications device 101, although this is not explicitly mentioned in FIG. 5c.

If the transceiver network element 502 becomes a new serving transceiver network element (step 553), it may receive data blocks from the previous serving transceiver network element in step 554. Thereafter the method 550 typically continues similarly as the method 510.

It is appreciated that in the second embodiment the serving transceiver network element in the uplink direction may be a separate network element from the serving transceiver network element in the downlink direction (if the communications device is assigned a serving site in the downlink direction). Especially if the uplink serving site is changed at the end of each data packet, the downlink serving site may be changed independently of the uplink serving site.

In a second alternative of the second embodiment, the change of the serving transceiver network element is not necessarily done in the end of a data packet. Furthermore, the serving uplink transceiver network element may be changed together with a change of the serving transceiver network element in the downlink direction. The downlink serving site is typically changed based on the network algorithms. The decision can be based, for example, on the pilot signal measurement reporting from the mobile or on the relative uplink measurements from different base stations.

Referring to FIG. 5b, a method in accordance the second alternative of the second embodiment would not necessarily contain steps 511, 516 and 517. The change of a downlink serving site would, however, lead to step 515. A further variant of the second embodiment is that the change of a downlink serving site causes change of the uplink serving site at the end of a next data packet.

If the uplink serving site is changed at the end of a data packet, the possibly are ready received data blocks relating to a next data packet are typically forwarded to the new serving site. The new serving site can then forward a complete data packet to the communications system after receiving rest of the data blocks relating to this data packet from the communications device 101.

It is appreciated that a communications device 101 in the situations described in FIG. 5a believes that it is in a soft handover. It never receives positive acknowledgment information from the transceiver network elements 502 belonging to its active set, but the soft-handover functionality in the communications device 101 is able to cope with these situations.

Figure 6A:
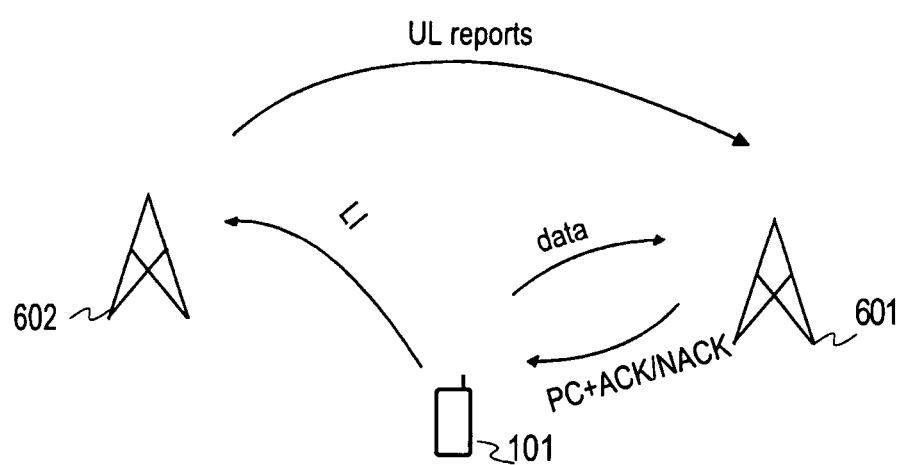
FIG. 6a shows schematically functionality in accordance with a third embodiment of the invention.

FIG. 6a shows schematically functionality in accordance with a third embodiment of the invention. The serving transceiver network element 601 receives data blocks sent by the communications device 101 and sends acknowledgement information and typically also power control commands accordingly to the communications device 101. The second transceiver network element 602 is synchronized with the physical transmission channel relating to the data blocks sent by the communications device. The second transceiver network element 602 determines the quality of the uplink radio path and reports the quality to the serving transceiver network element 601. The communications device 101 in FIG. 6a may believe that it is performing a basic hard handover, whereas the communication system is performing a prepared hard handover. As in connection with FIGS. 4a and 5a there may be one or more second transceiver network elements 602.

Information about the quality of the uplink radio path is typically determined based on the received signal quality or pilot bit error rate.

Figure 6B:
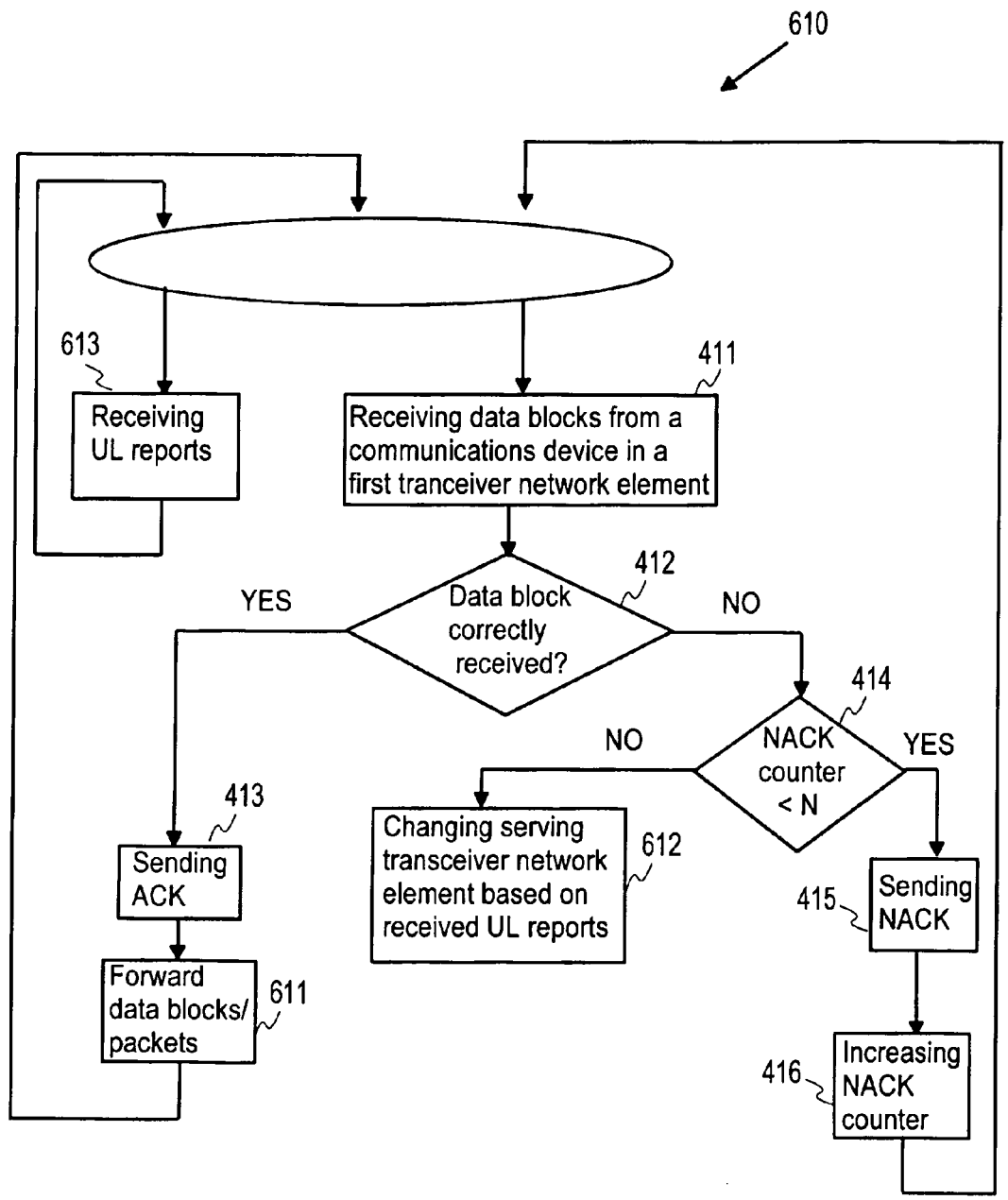
FIG. 6b shows, as an example, a flowchart of one method of operating a serving transceiver network element in accordance with the third embodiment of the invention.

FIG. 6b shows, as an example, a flowchart of a method 610 of operating a serving transceiver network element 601. Steps 411 to 416 are similar to steps methods 410 and 510. In step 613 information about the quality of the uplink radio path is received from (at least one of) the second transceiver network element(s) 602. If the retransmissions cannot provide successful receipt of data blocks, the serving transceiver network element may be changed in step 712 based on the received information about the quality of the uplink radio path. Furthermore, based on the quality of the uplink quality relating to the mobile station the serving transceiver network element 601 may initiate change of the serving site. Triggering of the change of the serving site may thus be based on uplink quality and/or retransmissions.

Figure 6C:
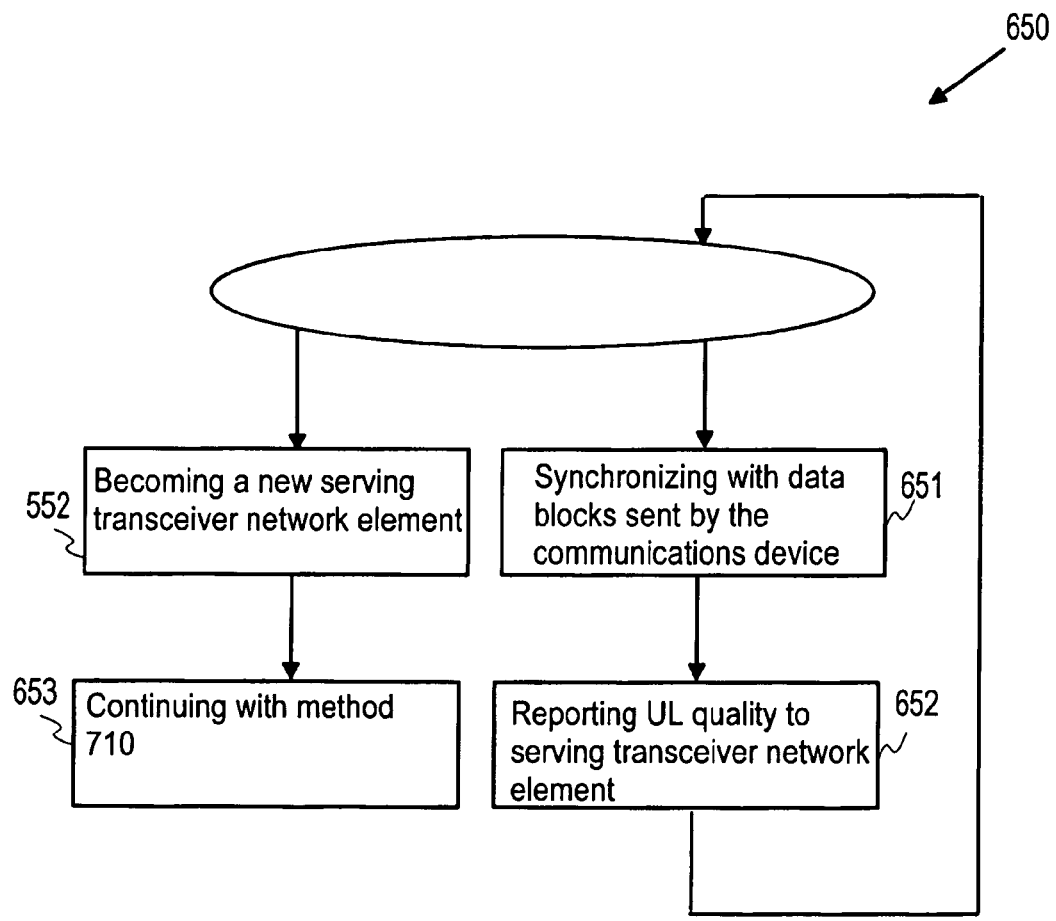
FIG. 6c shows, as an example, a flowchart of one method of operating an assisting transceiver network element in accordance with the third embodiment of the invention.

FIG. 6c shows, as an example, a flowchart of a method 650 of operating an assisting transceiver network element 602. In step 651, the transceiver network element 602 synchronizes with data blocks sent by the communications device 101. In step 652, the transceiver network element 602 reports uplink quality between the communications device 101 and the transceiver network element 602 to the serving transceiver network element 601. In step 552, the transceiver network element 602 may become the new serving transceiver network element. In that case, the transceiver network element 602 continues operation in accordance with the method 610.

It is possible that the assisting transceiver network entity 602 sends power control commands to the communications device 101. In this case, the power control target values are typically adjusted so that the assisting transceiver network element 602 has less influence on the power level of the communications device 101 than the serving transceiver network element 601.

It is appreciated that the functionality in accordance with an embodiment of the invention may be implemented, for example, by providing a suitable adapter device to be connected to or inserted into a transceiver network element for a cellular communications system. The adapter device provides additional functionality to a standard transceiver network element. The adapter device may be, for example, a plug-in card or a separate adapter device to be placed adjacent to an existing transceiver network element. Alternatively, it is possible to modify the hardware and/or software of an existing transceiver network element for a hierarchical communication system so that the transceiver network element is in accordance with an embodiment of the invention.

In the following the additional functionality provided by the adapter is discussed. The same discussion applies also the changes to be done to the hardware/software of an existing transceiver network element for a hierarchical communications system. It is appreciated that a skilled person also understands based on this discussion how to build a transceiver network element in accordance with an embodiment of the invention from the scratch.

In accordance with the first embodiment of the invention, the adapter would support the following features relating to the serving site: requesting erroneously received data blocks from an assisting site and combining received and requested data blocks. The adapter would support the following feature for the assisting site: sending only requested data blocks from non-serving site instead of sending all received data blocks.

In accordance with the second embodiment of the invention, the adapter would support the following functionality. Only the serving site sends ACK messages for received data blocks, other sites in the active set send only NACKs. Changing serving site should be done only within the active set. At least in accordance with the first alternative, the serving site is changed in the end of a data packet and already received data blocks are forwarded from a previous serving site to a new serving site. The serving site change may be done at the end of each data packet or it may be trigger by some other criterion. As one example, the uplink serving site may be changed in conjunction with the change of the downlink serving site.

In accordance with the third embodiment of the invention, the adapter would support the following functionality. The serving site receives UL reports from at least other site and decides about change of the service site, for example, based on the UL reports and/or retransmissions. The at least one other site is synchronized with the data blocks sent by the communications device, and they send UL reports.

It is appreciated that typically a transceiver network element in accordance with embodiments of the invention is arranged to act as a serving transceiver network element and as an assisting transceiver network element, as needed. There may be reasons, however, to set up specific transceiver network elements to operate only as assisting transceiver network elements or only as serving transceiver network elements.

It is appreciated that in the term communications device refers here to any communications device capable of communicating via a communications system. Examples of communications devices are user equipment, mobile telephones, mobile stations, personal digital assistants, laptop computers and the like. Furthermore, a communications device need not be a device directly used by human users.

It is appreciated that the term serving transceiver network element (serving site) in this description and in the appended claims refers to a transceiver network element primarily responsible for controlling transfer of data blocks from a communications device. Typically the serving transceiver network element controls (at least partly) the transmission power of the communications device by sending power control commands.

It is appreciated that the term assisting transceiver network element (assisting site) in this description and in the appended claims refers to a transceiver network element at least paying attention to (noticing) data blocks sent by a communications device. The assisting transceiver network element may receive and process the data blocks properly for enabling sending them further, for example, to the serving transceiver network element, but for sending negative acknowledgement information and for sending power control commands this is not necessary.

The assisting transceiver network element may send acknowledgement information, which may be either positive and negative acknowledgement messages or only negative acknowledgment messages. Typically the assisting transceiver network element sends power control commands to the communications device for controlling uplink interference.

It is appreciated that the assisting transceiver network element may discard sending of acknowledgment information. In this case, the assisting transceiver network element sends power control commands for controlling uplink interference. By selecting the target values for the power control properly in the serving site and the assisting site, it is possible to adjust how much the serving site and the assisting site affect the power control procedure. The target value for the power control typically reflects an uplink transmission quality (for example, block error rate) that should be reached. Typically the serving site has a stricter target value than the assisting site.

It is appreciated that a computer program in accordance with an embodiment of the invention may be embodied on a record medium, stored in a computer memory or carried on an electrical carrier signal.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
   receiving in a first apparatus data blocks from a communications device over a wireless interface;
   checking in the first apparatus whether data blocks have been correctly received;
   requesting in the first apparatus at least part of at least one data block corresponding to at least one erroneously received data block from a second apparatus; and
   receiving in the first apparatus the requested at least part of at least one data block.

2. A method as defined in claim 1, further comprising:
   sending information indicating whether data blocks have been correctly received to the communications device from the first apparatus.

3. A method as defined in claim 1, wherein at least one data block is requested from the second apparatus, the method comprising forwarding information received in correctly received data blocks and requested data blocks to a routing network element.

4. A method as defined in claim 1, further comprising:
   combining at least one data block received from the communications device and said at least part of at least one data block to form a diversity combined data flow; and
   forwarding the diversity combined data flow to a routing network element.

5. A method as defined in claim 1, further comprising:
   receiving data blocks from the communications device in the second apparatus;
   receiving a request to send said at least part of at least one data block; and
   sending said at least part of said at least one data block to the first apparatus from the second apparatus.

6. A method, comprising:
   receiving data blocks from a communications device in a second apparatus over a wireless interface;
   receiving from a first apparatus a request to send at least part of at least one data block to the first apparatus; and
   sending said at least part of at least one data block to the first apparatus from the second apparatus.

7. A method as defined in claim 6, further comprising:
   sending information indicating whether data blocks have been correctly received to the communications device from the second apparatus.

8. An apparatus, comprising:
   first receiving means for receiving data blocks from a communications device over a wireless interface;
   checking means for checking whether data blocks have been correctly received;
   requesting means for requesting from a second apparatus at least part of at least one data block corresponding to at least one erroneously received data block, when the apparatus is configured as a serving transceiver network element for the communications device; and
   second receiving means for receiving said at least part of at least one data block corresponding to at least one erroneously received data block from the second apparatus.

9. An apparatus as defined in claim 8, further comprising:
   transmitting means for sending at least part of at least one further data block to a further apparatus, when the apparatus is configured as an assisting transceiver network element for a further communications device.

10. An apparatus, comprising:
    first receiving means for receiving data blocks from a communications device over a wireless interface;

second receiving means for receiving a request to send at least part of at least one data block received erroneously to a further apparatus; and transmitting means for sending said at least part of at least one data block to the further apparatus.

11. An apparatus, comprising:
requesting means for requesting, when the apparatus is configured as a serving transceiver network element for a communications device, from a further apparatus at least part of at least one data block corresponding to at least one erroneously received data block, wherein the at least on erroneously received data block has been sent by the communications device and received in the apparatus over a wireless interface; and
receiving means for receiving from the further apparatus the requested at least part of at least one data block.

12. An apparatus, comprising:
receiving means for receiving a request to send at least part of at least one data block to a further apparatus, wherein said at least part of a data block is received erroneously from a communication device; and
transmitting means for sending said at least part of at least one data block to the further apparatus.

13. A system, comprising:
receiving means in a first transceiver network element for receiving data blocks from a communications device over a wireless interface;
checking means in the first transceiver network element for checking whether data blocks have been correctly received in the first transceiver network element;
requesting means in the first transceiver network element for requesting from a second transceiver network element at least part of at least one data block corresponding to at least one erroneously received data block, when the first transceiver network element is configured as a serving transceiver network element for the communications device; and
transmitting means in the second transceiver network element for sending said at least part of at least one data block to the first transceiver network element from the second transceiver network element.

14. A computer program embodied on a non-transitory computer-readable medium, the computer program being configured to control a processor to perform:
receiving data blocks in a first transceiver network element from a communications device over a wireless interface;
checking by the first transceiver network element whether data blocks have been correctly received;
requesting in the first transceiver network element at least part of at least one data block from a second transceiver network element corresponding to at least one erroneously received data block; and
receiving in the first transceiver element the requested at least part of at least one data block.

15. An apparatus, comprising:
a processor; and
memory including computer program code,
wherein the memory and the computer program code are configured, with the processor, to cause the apparatus, at least, to
receive data blocks from a communications device over a wireless interface;
check whether data blocks have been correctly received;
request from a further apparatus at least part of at least one data block corresponding to at least one erroneously received data block, when the apparatus is configured as a serving transceiver network element for the communications device; and
receive said at least part of at least one data block corresponding to at least one erroneously received data block from said further apparatus.

16. An apparatus as defined in claim 15, wherein the memory and the computer program code are further configured, with the processor, to cause the apparatus to send at least part of at least one data block to a further apparatus, when the apparatus is configured as an assisting transceiver network element for a further communications device.

17. An apparatus, comprising:
a processor; and
memory including computer program code,
wherein the memory and the computer program code are configured, with the processor, to cause the apparatus, at least, to
erroneously receive data blocks from a communications device over a wireless interface;
receive a request to send at least part of at least one data block to a further apparatus; and
send said at least part of at least one data block to the further apparatus.

18. An apparatus, comprising:
a processor; and
memory including computer program code,
wherein the memory and the computer program code are configured, with the processor, to cause the apparatus, at least, to
request, when the apparatus is configured as a serving transceiver network element for a communications device, from a further apparatus at least part of at least one data block corresponding to at least one erroneously received data block, wherein the at least on erroneously received data block has been sent by the communications device and received in the apparatus over a wireless interface; and
receive from the further apparatus the requested at least part of at least one data block.

19. An apparatus, comprising:
a processor; and
memory including computer program code,
wherein the memory and the computer program code are configured, with the processor, to cause the apparatus, at least, to
receive a request to send at least part of at least one data block erroneously received from a communication device to a further apparatus; and
send said at least part of at least one data block to the further apparatus.

20. A system, comprising:
a receiver configured to receive in a first transceiver network element data blocks from a communications device over a wireless interface;
a checking unit in the first transceiver network element configured to check whether data blocks have been correctly received in the first transceiver network element;
a requesting unit in the first transceiver network element configured to request from a second transceiver network element at least part of at least one data block corresponding to at least one erroneously received data block, when the first transceiver network element is configured as a serving transceiver network element for the communications device; and
a transmitter in the second transceiver network element configured to send said at least part of at least one data block to the first transceiver network element from the second transceiver network element.

21. A computer program embodied on a non-transitory computer-readable medium, the computer program being configured to control a processor to perform:
   receiving data blocks from a communications device erroneously in a second apparatus over a wireless interface;
   receiving from a first apparatus a request to send at least part of at least one data block to the first apparatus; and
   sending said at least part of at least one data block to the first apparatus from the second apparatus.

* * * * *